(12) United States Patent
Gassmann (10) Patent No.: US 8,992,366 B2
(45) Date of Patent: Mar. 31, 2015

(54) ELECTRIC DRIVE FOR A MOTOR VEHICLE (75) Inventor: Theodor Gassmann, Siegburg (DE)

(73) Assignee: GKN Driveline International GbmH, Lohmar (DE)

(*) Notice: Subject to any disclaimer, the term of this patent is extended or adjusted under 35 U.S.C. 154(b) by 138 days.

(21) Appl. No.: 13/809,872

(22) PCT Filed: Jul. 13, 2010

(86) PCT No.: PCT/EP2010/060040
§ 371 (c)(1),
(2), (4) Date: Mar. 22, 2013

(87) PCT Pub. No.: WO2012/007031
PCT Pub. Date: Jan. 19, 2012

(65) Prior Publication Data
US 2013/0190124 A1 Jul. 25, 2013

(51) Int. Cl.
F16H 48/30 (2012.01)
F16H 37/08 (2006.01)
B60K 1/00 (2006.01)

(52) U.S. Cl.
CPC *F16H 37/08* (2013.01); *B60K 1/00* (2013.01); B60K 2001/001 (2013.01)
USPC .............................. 475/150; 475/149; 475/221

(58) Field of Classification Search
CPC ........... F16H 8/08; F16H 48/10; F16H 48/19; F16H 48/20; F16H 48/22; F16H 48/24; F16H 48/114
USPC .......... 475/149, 150, 221, 231, 249, 302, 343
See application file for complete search history.

(56) References Cited

U.S. PATENT DOCUMENTS 5,735,767 A * 4/1998 Forsyth ......................... 475/269
7,497,286 B2 3/2009 Keller et al.
8,556,760 B2 * 10/2013 Mack et al. .................... 475/152
2009/0192005 A1 7/2009 Carey et al.
2009/0209385 A1 8/2009 Carey et al.
2009/0209388 A1 8/2009 Carey et al.

FOREIGN PATENT DOCUMENTS

WO WO-2010053745 A1 5/2010

OTHER PUBLICATIONS

PCT International Search Report for PCT/EP2010/060040 dated Jan. 17, 2011.

* cited by examiner

*Primary Examiner* — Michael Mansen
*Assistant Examiner* — Tinh Dang
(74) *Attorney, Agent, or Firm* — Bejin Bieneman PLC (57) ABSTRACT An electric drive for a motor vehicle is disclosed that comprises an electric motor and a drive unit drivable by the electric motor. The drive unit has a planetary drive and a differential drive 9, which are arranged coaxially to a rotational axis A. The planetary drive comprises a ring gear, a sun gear, a plurality of planet gears as well as a planet carrier. The ring gear is rotatingly driveable by the electric motor around the rotational axis A. The sun gear is supportable or supported relative to a stationary component against rotation. The planet carrier is connected to a differential carrier of the differential drive so as to transmit torque thereto. A motor vehicle with such an electric drive is also disclosed.

16 Claims, 5 Drawing Sheets

ELECTRIC DRIVE FOR A MOTOR VEHICLE

TECHNICAL FIELD

The disclosure relates to an electric drive for a motor vehicle as well as a motor vehicle with such an electric drive. The electric drive can serve as an exclusive drive for the motor vehicle or additionally a combustion engine can be provided. In this case, the electric drive and the combustion engine can drive the vehicle, respectively, on their own or together superimposed. Such drive concepts are also designated as "hybrid drives".

BACKGROUND

Usually, an electric drive comprises an electric motor as well as a reduction gear arranged downstream of the electric motor and which transmits the rotational movement produced by the electric motor from a faster to a slower speed. The torque is transmitted from the reduction gear to the driveline line of the motor vehicle. For this, a differential drive, which is arranged downstream in the torque flow of the reduction gear, splits the introduced torque onto two output shafts for driving the wheels. The two output shafts of the differential drive have an equalizing effect on each other, i.e. if one of the two output shafts rotates faster, then the other of the two output shafts rotates correspondingly slower, and vice versa.

From U.S. Pat. No. 7,497,286 B2 an electric drive for driving a motor vehicle is known. The electric drive comprises an electric motor, a planetary drive as a reduction gear and a differential drive, which is arranged downstream of the reduction gear in the torque flow. The planetary drive and the differential drive are arranged coaxially and within the electric motor. The sun gear of the planetary drive is driven by the electric motor. The planet carrier is supported and the ring gear drives the differential carrier of the differential drive.

The integration of an electric drive or hybrid drive, respectively, with a downstream arranged reduction gear in the motor vehicle is very often difficult, because the available space is very tightly dimensioned.

SUMMARY

An electric drive for a motor vehicle is proposed, which is compact and enables a simple integration into the existing space requirements. More specifically, an electric drive for a motor vehicle is disclosed that comprises an electric motor and a drive unit that is driveable by the electric motor. The drive unit has a planetary drive and a differential drive, which are arranged coaxially to a rotational axis. The planetary drive comprises a ring gear, a sun gear, a multitude of planet gears as well as a planet carrier, wherein the ring gear is rotatingly driveable by the electric motor around the rotational axis. The sun gear is supportable or supported on a stationary component against rotation. The planet carrier is connected to a differential carrier of the differential drive so as to transmit torque thereto.

The electric drive has the advantage that the electric drive has a compact configuration. The torque produced by the electric motor is introduced via the ring gear into the planetary drive. By this, it is again achieved, that the planetary drive and the differential drive can be arranged within the ring gear or in a component firmly connected to the ring gear. As the planetary drive and the differential drive are arranged coaxially to each other, respectively to the rotational axis, the drive unit has a small radial construction size. The support of the sun gear on the stationary component can be directly or indirectly. By indirect support it is meant, that the sun gear is rotationally fixedly connected via one or more interconnected elements to the stationary component, for example by means of a hollow shaft, which is supportable or is supported against rotation at the stationary housing. "Supported" means, that the sun gear is permanently supported relative to the stationary component in the sense of rotation. By "supportable" it is meant, that the sun gear can selectively be connected to the stationary component in a rotationally fixed way or can be released relative thereto so as to be freely rotatable, for example by means of a clutch.

The electric drive is suitable as an exclusive drive for a motor vehicle or as an additional drive source in a motor vehicle, which has a combustion engine as the main drive source, which are also designated as hybrid drives. The electric drive can be used for driving any drive axle, i.e. front axle as well as rear axle.

According to one exemplary embodiment, the ring gear of the planetary drive is firmly connected to a housing that is rotatingly driveable by the electric motor. The rotatingly driveable housing may be rotatably supported in a stationary housing around the rotational axis. The stationary housing may be firmly connected to the electric motor and has an attachment mechanism for the attachment on the motor vehicle. In one exemplary arrangement, the planetary drive and the differential drive are accommodated in the rotatingly driveable housing. In this case, the planetary drive and the differential drive may be arranged axially next to each other. Because of this embodiment with a rotatingly driveable housing, the planetary drive and the differential drive form a compact assembly unit. For the introduction of the torque by the electric motor into the rotatable housing, the latter has at the outside means of the torque introduction, which can, for example, include an outer toothing or a drive disk.

According to another exemplary embodiment, the planet carrier of the planetary drive is firmly connected to the differential carrier of the differential drive so as to transmit torque thereto. The planet carrier or the differential carrier are, respectively, rotatably supported relative to the rotatingly driveable housing around the rotational axis. For a compact configuration and a direct force flow, it is advantageous, when the planetary drive is arranged at least partially in the area of the means for the torque introduction. For example, the planetary drive may be arranged at least approximately in the area of the torque introduction and the differential drive is axially arranged next to the planetary drive.

For the flexible torque introduction or a change of the transmission ratio, an externally controllable clutch assembly can be provided, which is arranged operatively between the sun gear of the planetary drive and the stationary component. The clutch assembly is formed such, that a torque can be transmitted between the sun gear and the stationary component or torque transmission can be interrupted. The clutch assembly can be arranged in principle at any position in the power flow path between the sun gear and the stationary component. For actuating the clutch assembly, an externally controllable actuating device is provided. The actuating device is selectively controlled by an electronic control unit of the motor vehicle, according to the requirements.

The clutch assembly can have different embodiments. For example, the clutch assembly can comprise a switching clutch, which carries out via form fitting means a torque transmission between the clutch input element and the clutch output element. As examples, in this case, a dog clutch or a denture clutch or a claw clutch have to be named. The clutch assembly can also comprise one or more friction clutches, which effect the torque transmission via the force fit. Friction clutches have the advantage that the torque transmission is variably adjustable in any intermediate position between an open position, in which no torque is transmitted, and a closed position, in which the complete torque is transmitted between the clutch input element and the clutch output element.

In the embodiment, in which the clutch assembly comprises a switching clutch, this is at least transferable into a first switching position and into a second switching position. In the first switching position the sun gear is connected to the stationary component in a rotationally fixed way and the hollow gear is freely rotatable relative to the sun gear. In the second switching position, the sun gear is connected so as to be rotationally fixed to the ring gear for the transmission of torque and is freely rotatable relative to the stationary component. By means of shifting the switching clutch into the first or the second switching position, respectively, different transmission ratios of the planetary drive, for example a first transmission ratio, which is smaller than five, i.e. i1<5, and a second transmission ratio, which is smaller than eight, i.e. i1<8, can be achieved. When using a friction clutch instead of a switching clutch, the transmission ratio, also in the intermediate range between the first and second transmission ratio, are freely adjustable. The switching clutch can also have a third switching position, in which the sun gear is freely rotatable relative to the stationary component and to the ring gear. This switching position can also be designated as the idle position.

For the highest degree of flexibility, concerning the adjustment of the to be transmitted torque, it is advantageous, when the clutch assembly comprises a first friction clutch, which is arranged between the sun gear of the planetary drive and the stationary component, and a second friction clutch, which is arranged between the sun gear and the ring gear. In particular, the first and the second friction clutch, respectively, are variably controllable between an open position, in which a torque transmission is interrupted, and a closed position, in which a torque is transmitted, including any intermediate position. In one exemplary configuration, the friction clutches are formed as multi-disk clutches. The multi-disk clutches comprise, respectively, a clutch input element, with which first disks are connected so as to be rotationally fixed, and a clutch output element, with which second disks are connected so as to be rotationally fixed. The first and second disks are axially arranged alternatingly and form together a disk pack.

According to a first possibility, a separate actuating device, which can actuate the corresponding friction clutch individually, is provided for each of the first and the second friction clutch. According to a second possibility also a common actuating device, which is formed such that the first friction clutch is closed, when the second friction clutch is opened and vice versa, can be provided for the first and the second friction clutch.

According to another exemplary embodiment, which is valid for all the above named embodiments, the drive unit comprises a gear stage, which is arranged in the torque flow direction between the electric motor and the planetary drive. This first gear stage, driven by the electric motor, may be a reduction gear, which produces a transmission to the slower. The first gear stage comprises a chain drive or a belt drive or a single-step or multi-step spur gear drive. The electric motor is, preferably, aligned to an axis, which is arranged parallel to the rotational axis of the planetary drive and the differential drive, wherein the first drive unit bridges the distance between the axis of the electric motor and the rotational axis of the planet drive and the differential drive, respectively.

A motor vehicle with one or more of the embodiments of an electric drive described above is also within the disclosure.

The advantage is, that in the motor vehicle only a small configuration space needs to be available to employ the electric drive disclosed herein. By small modifications of the first gear stage, different transmission ratios can be produced, which can be adapted to the requirements of the vehicle drive.

BRIEF DESCRIPTION OF THE DRAWINGS

Exemplary embodiments are described in the following using the drawing figures in which.

DETAILED DESCRIPTION

Figure 1:
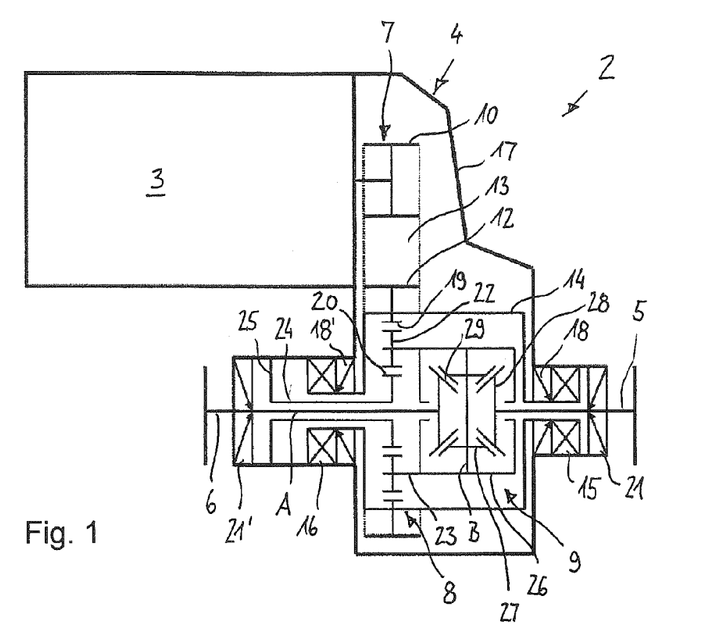
FIG. 1 schematically discloses an electric drive according to a first embodiment with a belt drive, FIG. 2 schematically discloses an electric drive according to a second embodiment with a chain drive, FIG. 3 schematically discloses an electric drive according to a third embodiment with a one-step spur gear drive, FIG. 4 schematically discloses an electric drive according to a fourth embodiment with a two-step spur gear drive, FIG. 5 schematically discloses an electric drive according to a fifth embodiment with a belt drive and switching clutch, FIG. 6 schematically discloses an electric drive according to a sixth embodiment with a chain drive and switching clutch, FIG. 7 schematically discloses an electric drive according to a seventh embodiment with a one-step spur gear drive and a switching clutch, FIG. 8 schematically discloses an electric drive according to an eighth embodiment with a two-step spur gear drive and a switching clutch, FIG. 9 schematically discloses an electric drive according to a ninth embodiment with a two-step spur gear drive and two friction clutches and FIG. 10 schematically discloses an electric drive according to a tenth embodiment with belt drive and clutch assembly.

FIG. 1 shows an electric drive 2 according to a first embodiment. The electric drive 2 comprises an electric motor 3 and a drive unit 4, which transmits a torque introduced by the electric motor 3 onto two side shafts 5, 6. The drive unit 4 comprises a first gear stage 7, a second gear stage 8 and a third gear stage 9, which third gear stage is formed as a differential drive. It is visible, that the electric motor 3 on the one hand and the differential drive 9 on the other, are arranged offset to each other with a distance.

The first gear stage 7 comprises in the present embodiment according to FIG. 1 a belt drive assembly with a driving wheel 10 and an output wheel 12, which is driven by an infinite belt 13 by the driving wheel 10. The driving wheel can also be referred to as input wheel. It is visible, that the output wheel 12 has an essentially larger diameter than the driving wheel 10, so that here a gear transmission to a slower speed is achieved. The axle offset between the electric motor 3 and the planet gear 8 or the differential drive 9 is bridged with the first gear stage 7.

The output wheel 12 is firmly connected to a housing 14, which is rotatingly driveable via the belt drive around the rotational axis A. The planetary drive 8 is arranged within the output wheel 12, which has positive effects on the configuration size of the 25 drive unit 4. The rotatingly driveable housing 14 is rotatably supported by first and second bearing members 15, 16 in a stationary housing 17 of the drive unit 4. The annular chamber between the stationary housing 17 and the rotatingly driveable housing 14 is sealed by sealing members 18, 18', for example sealing rings. The annular chamber between the side shafts 5, 6 and the stationary housing 17 or a formed-on sleeve of the housing 17 is sealed by means of suitable sealing members 21, 21', which can, for example, be in the form of radial shaft sealing rings.

Within the rotatingly driveable housing 14, the second gear stage 8 and the third gear stage 9 are accommodated. It is visible, that the second gear stage 8 comprises a planetary drive. The planetary drive 8 has a ring gear 19, which is firmly connected to the rotatingly driveable housing 14, a sun gear 20, which is arranged coaxially to the rotational axis A, a plurality of planet gears 22, which engage in the ring gear 19 and the sun gear 20, as well as a planet carrier 23, which is rotatably supported around the rotational axis A. The ring gear 19 is connected with the rotatingly driveable housing 14 so as to rotate jointly therewith. More particularly, the ring gear 19 is attached internally on the rotatingly driveable housing 14, for example is welded to the same or is formed integrally with the same. The sun gear 20 is firmly connected to a hollow shaft 24, so as to rotate jointly therewith. The hollow shaft 24 is arranged coaxially to the rotational axis A and is connected via suitable attachment means 25 at least in a rotationally fixed way to the stationary housing 17 or a component connected fast thereto. By means of the rotationally fixed connection of the hollow shaft 24 or of the sun gear 20, respectively, to the stationary housing 17, a torque introduced into the sun gear 20 can be supported relative to the stationary housing 17.

The rotationally fixed connection between the hollow shaft 24 and the stationary housing 17 can be achieved by any suitable attachment means 25. For example, a formfitting connection, like shaft splines or Hirth-serration, or a force-fitting connection, like a brake or clutch, or a material connection can be used. The planet carrier 23 drives the third gear stage 9, i.e. the differential drive. The differential drive 9 comprises a differential carrier 26, which is rotatingly driveable around the rotational axis A, a plurality of differential gears 27, which are rotatably supported in the differential carrier 26 on the rotational axis B and rotate together with the differential carrier 26 around the rotational axis A, as well as two side shaft gears 28, 29, which are respectively arranged coaxially to the rotational axis A and meshing engage the differential gears 27. A torque introduced into the differential carrier 26 is transmitted by the differential gears 27 to the two side shaft gears 28, 29, wherein a compensating effect exists between the two side shaft gears 28, 29. The side shaft gears 28, 29 are connected in a rotationally fixed way to the respective side shafts 5, 6, so as to transmit torque thereto, which side shafts 5, 6 transmit the introduced torque to the wheels of a motor vehicle.

It is visible, that the planet carrier 23 of the planetary drive 8 is firmly connected to the differential carrier 26 of the differential drive 9, i.e. the planet carrier 23 forms the output element of the planetary drive 8, by means of which the torque is introduced by the planetary drive 8 into the differential drive 9. The connection between the planet carrier 23 and the differential carrier 26 can be any type of fixed connection which is suitable for transmitting torque, such a bolted or a welded connection. By the present arrangement of the drive unit 4 with a first gear stage 7 in form of a belt drive, a second gear stage 8 as a planetary drive with a ring gear 19 as an input element, a rotationally fixed supported sun gear 20 and a planet carrier 23 as an output element, a transmission ratio to the slower of smaller than 8 can be achieved, i.e. i<8. This means, that the differential carrier 26 rotates up to 8 times as slow than the drive shaft of the electric motor 3. In the present embodiment with a belt drive as a first gear stage 7, the inner chamber of the stationary housing 17 is dry, i.e. no lubrication is necessary in this case. Only the rotatingly driveable housing 14 is filled with lubricant means for the cooling or lubrication of the planetary drive 8 and of the differential drive 9.

Figure 2:
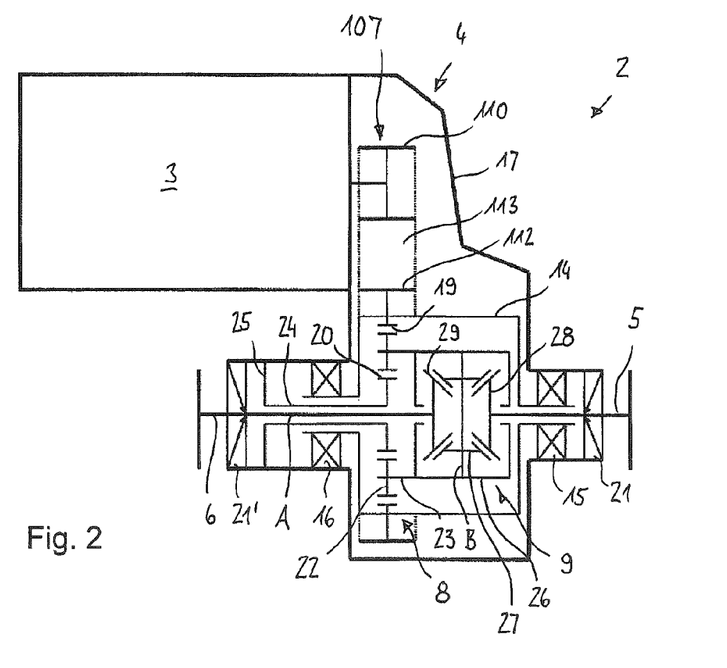

FIG. 2 shows an electric drive 2 according to a second embodiment. This largely corresponds to that of FIG. 1, so that, concerning the common features, it is referred to the above description. In this case, the same components are provided with the same reference numerals and changed components are provided with reference numerals which are increased by the numerical value 100.

The only difference of the present embodiment is, that the first gear stage 107 is in the form of a chain drive, which has a drive sprocket wheel 110 (input wheel), an output sprocket wheel 112 and a continuous chain 113 for transmitting the torque from the drive sprocket wheel 110 to the output sprocket wheel 112. As a chain drive is used as a first gear stage 107, the whole drive unit 4 can run for cooling or lubrication, respectively, in a common oil bath within the stationary housing 17. Separate seals between the rotatingly driveable housing 14 and the stationary transmission housing 17 are not necessary.

With the present embodiment with a chain drive 107, a transmission to the slower with a transmission ratio of smaller than eight can also be achieved, i.e. i<8.

Figure 3:
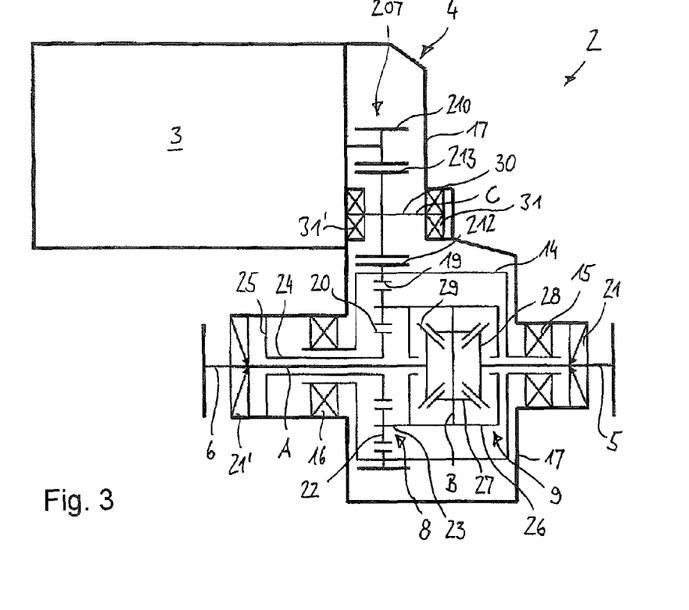

FIG. 3 shows an electric drive 2 according to a third embodiment. This largely corresponds to that of FIG. 1, so that concerning common features, it is referred to the above description. In this case, same or corresponding components are provided with the same reference numerals and changed components are provided with reference numerals which are increased by the numerical value 200.

The only difference of the present embodiment is that the first gear stage 207 is formed as a one-step spur gear drive, which transmits the torque introduced by the electric motor 3 to the rotatingly driveable housing 14. The spur gear drive 207 comprises a first gear 210, which can also be designated as the driving wheel, a second gear 213 and a third gear 212, which can also be designated as an output gear. The three gears 210, 212, 213 are formed especially in as spur gears, preferably with helical gear. The second gear 213 is rotatably supported around the rotational axis C, which is arranged parallel to the rotational axis A. For this, the second gear 213 is connected fast to a shaft 30, which is rotatably supported by first and second bearing arrangements 31, 31' in the stationary housing 17. The second gear 213 meshes with the first gear 210 as well as with the third gear 212. In this case, the teeth numbers of the three gears 210, 212, 213 are selected such, that with the drive unit 4 according to the present embodiment, a transmission to the slower with a transmission ratio of smaller than eight is achieved, i.e. i<8.

Figure 4:
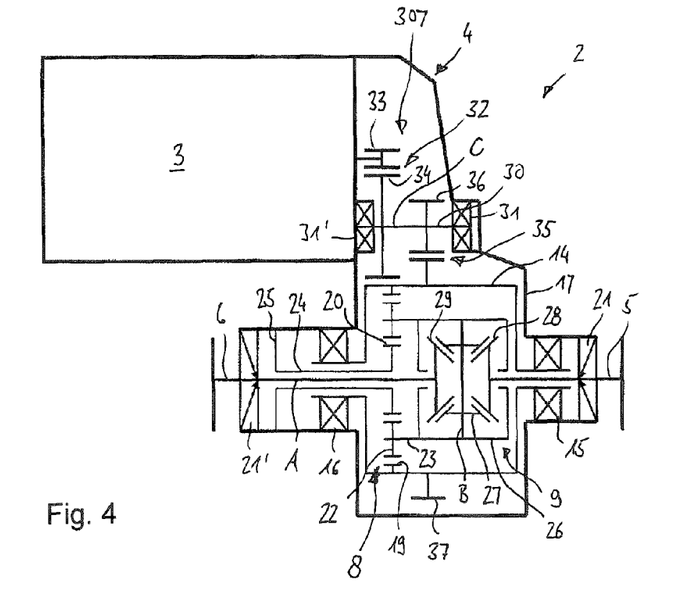

FIG. 4 shows an electric drive 2 according to a fourth embodiment. This largely corresponds to that of FIG. 3, so that concerning the common features, it is referred to the above description. In this case, the same or corresponding components are provided with the same reference numerals and changed components are provided with reference numerals, which are increased further by the numerical value of 100.

The distinctive feature of the present embodiment is that the first gear stage 307 is formed as a two-step spur gear drive. The spur gear drive 307 has a first spur gear step 32, which has a first gear 33 and a second gear 34, as well as a second spur gear step 35, which has a third gear 36 and a fourth gear 37. In this case, the first gear 33 forms the drive gear and the fourth gear 37 forms the output gear, respectively the means for introducing torque into the rotatingly driveable housing 14. The second and third gear 34, 36 are connected to each other in a rotationally fixed way and are rotatably supported around the rotational axis C in the stationary housing 17. It is visible, that the first gear 33 has an considerably smaller diameter, respectively smaller teeth number, than the diameter, respectively teeth number, of the second gear 34. In this way, a transmission to a slower speed is achieved. Also the third gear 36 has a smaller diameter, respectively a lower teeth number, than the fourth gear 37, so that here a further transmission to the slower is achieved. As a whole, with the present embodiment, a transmission to a slower speed with a transmission ratio of up to ten or even greater than ten can be achieved between the drive and the output. For example, the differential carrier 26 can rotate up to ten-times as slow than the drive shaft of the electric motor 3.

Figure 5:
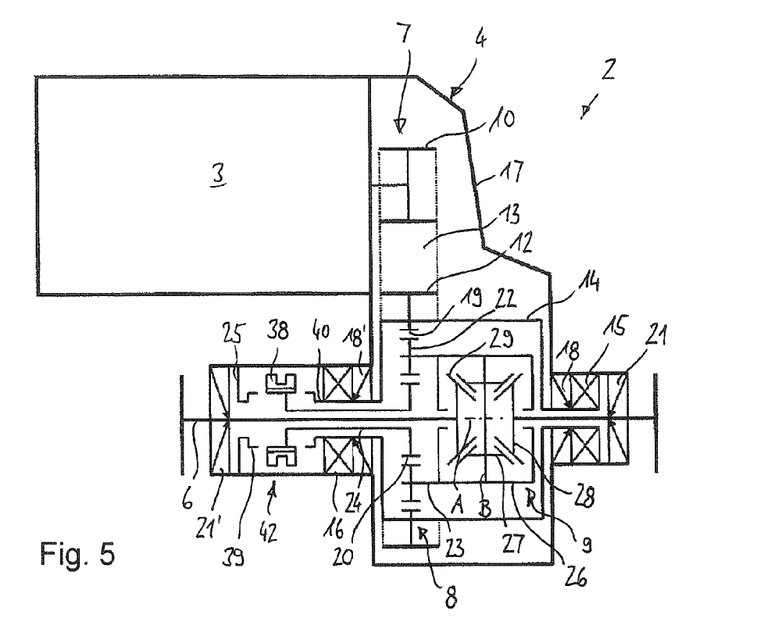

FIG. 5 shows an electric drive 2 according to a fifth embodiment. This corresponds generally to the embodiment of FIG. 1, so that concerning the common features, it is referred to the above description. In this case, the same or corresponding components are provided with the same reference numerals and changed components are provided with reference numerals which are increased again by the numerical value 100.

In the following, the special characteristic features of the present embodiment are described. Differing from the embodiment of FIG. 1, in the present embodiment a clutch assembly 42 is provided, which is arranged in the torque flow direction at the sun gear 20. The clutch assembly 42 is formed as a switching clutch. The switching clutch can be transferred into three switching positions. In a first switching position, the sun gear 20 is connected in a rotationally fixed way to the stationary component, respectively the stationary housing 17. In this switching position the present electric drive works as the embodiment according to FIG. 1, wherein a reduction gear ratio of smaller than eight can be achieved. In the second switching position, the sun gear 20 is connected by the switching clutch 42 being rotationally fixed to the ring gear 19, respectively the rotatingly driveable housing 14. For this, a sleeve 40 can be provided, which is firmly connected to the rotatingly driveable housing 14 and which forms the clutch output element. In this second switching position, the rotatingly driveable housing 14, the ring gear 19, the sun gear 20, the planet carrier 23 and the differential carrier 26, connected thereto, are rotating together around the rotational axis A. As a consequence no transmission to a slower speed is achieved by the planetary drive 8, so that the transmission to the slower speed in the second switching position is less than five, i.e. i<5. A transmission ratio of less than five means, that the differential carrier 26 rotates up to five-times as slow than the electric motor 3.

In the third switching position, the sun gear 20 is freely rotatable, i.e. relative to the ring gear 19 as well as relative to the stationary component 17. In this switching position, no torque transmission between the side shafts 5, 6 and the electric motor 3 takes place. This is, for example, necessary, when the motor vehicle has to be towed away during a breakdown.

Figure 6:
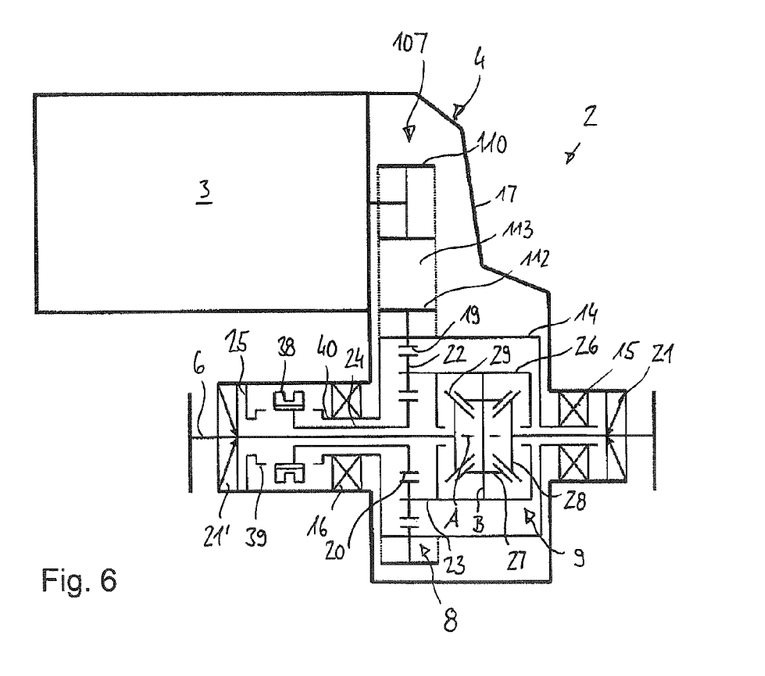

FIG. 6 shows an electric drive 2 according to a sixth embodiment. This corresponds to a combination of the embodiments of FIGS. 2 and 5, so that concerning the common features, it is referred to the above description. In this case, the same or corresponding components are provided with the same reference numerals.

The present embodiment is characterized in that, the first gear stage 107 is formed as a chain drive. Furthermore, a clutch assembly 42 in the form of a switching clutch is provided, which can connect the sun gear 20 so as to be selectively rotationally fixed to the stationary component 17 (first switching position) or to the ring gear 19 (second switching position) for transmitting a torque or can be released, so that it is freely rotatable (third switching position).

Figure 7:
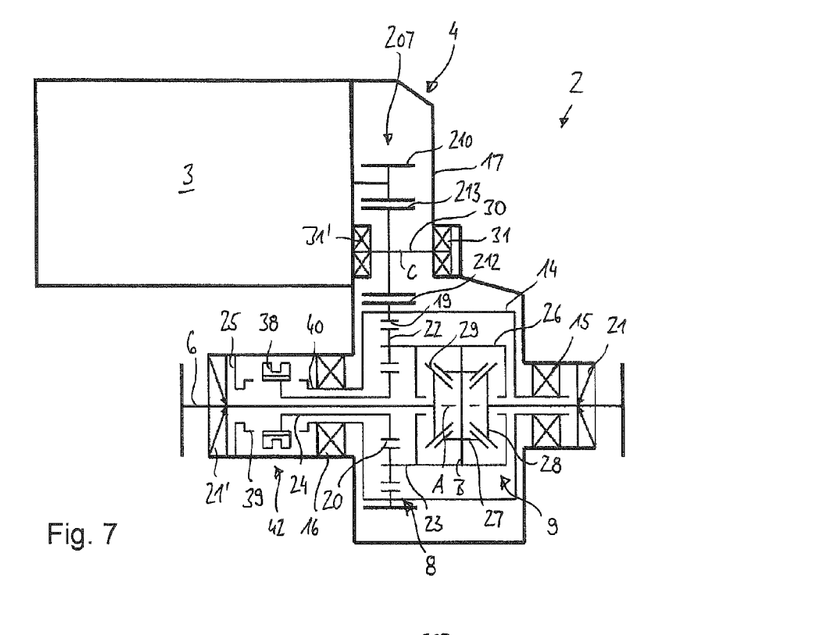

FIG. 7 shows an electric drive 2 according to a seventh embodiment. This embodiment corresponds to a combination of the embodiments of FIGS. 3 and 5, so that concerning the common features, it is referred to the above description. In this case, the same or corresponding components are provided with the same reference numerals.

In the present embodiment the first gear stage 207 is formed as a one-step spur gear drive, as for example shown in FIG. 3. Furthermore, a clutch assembly 42 in form of a switching clutch is provided at the planetary drive 8, as it is for example shown in FIG. 5. The clutch assembly 42 is formed such, that the sun gear 20 can be connected in a rotationally fixed way selectively to the stationary housing 17 (first switching position) or to the ring gear 19 (second switching position) for the transmission of a torque, or that the sun gear 20 is disconnected, so that it is freely rotatable around the rotational axis A (third switching position).

With the present embodiment with a single-step spur gear drive and switching clutch, a transmission to the slower is achieved. In this case, when the switching clutch is in the first switching position and the sun gear 20 is supported on the stationary housing 17 against rotation, a first transmission ratio i1 can be achieved, which is smaller than ten, i.e. i1<10. Thus, the differential carrier 26 rotates up to ten-times as slow than the electric motor 3. When the switching clutch is in the second switching position, so that the sun gear 20 and the ring gear 19 rotate together around the rotational axis A, no reduction is achieved in the planetary drive 8, so that in total a smaller gear reduction is achieved than in the first switching position. Especially, in the second switching position, a second transmission ration i2 can be achieved, which is smaller than ten, i.e. i2<10. This means, that the differential carrier 26 rotates up to then times as slow than the electric motor 3.

Figure 8:
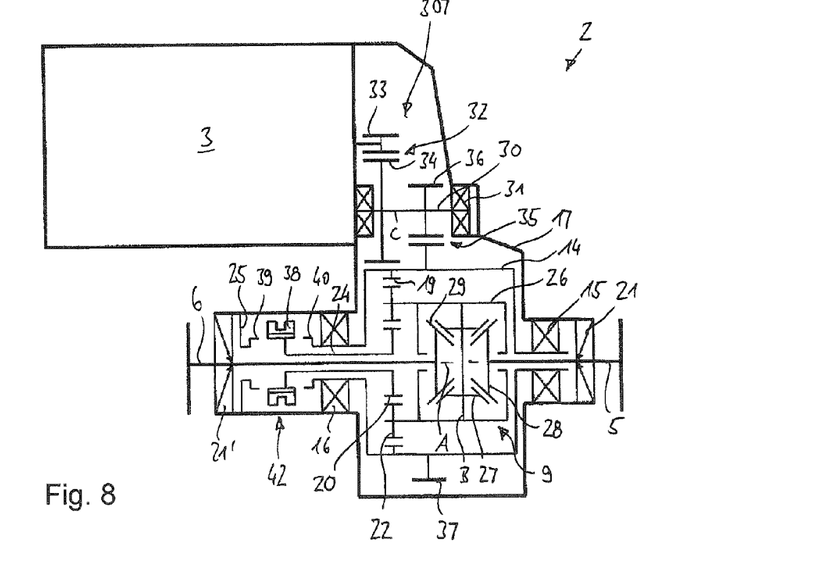

FIG. 8 shows an electric drive 2 according to an eighth embodiment. This embodiment corresponds to a combination of the embodiments according to FIGS. 4 and 5, so that concerning the common features, it is referred to the above description. In this case, the same or corresponding components are provided with the same reference numerals.

In the present embodiment, the first gear stage 37 is formed as a two-step spur gear drive, as it is shown in FIG. 4. Furthermore, on the planetary drive 8, a clutch assembly 42 in the form of a switching clutch is provided, as it is for example shown in FIG. 5. The clutch assembly 42 is formed such, that the sun gear 20 can be selectively connected in a rotationally fixed way to the stationary housing 17 (first switching position) or to the ring gear 19 (second switching position) for the transmission of torque, or that the sun gear 20 can be disconnected, so that it is freely rotatable around the rotational axis A (third switching position).

With the present embodiment with a two-step spur gear drive and a switching clutch, a transmission to the slower is achieved. In this case, when the switching clutch is in the first switching position and the sun gear 20 is supported on the stationary housing 17 against rotation, a first transmission ratio i1 can be achieved, which is smaller than 17 (i1<17), i.e. that the differential carrier 26 rotates up to 17-times as slow than the electric motor 3. When the switching clutch is in the second switching position, so that the sun gear 20 and the ring gear 19 rotate together around the rotational axis A, a second transmission ratio i2 is achieved, which is smaller than the first transmission ratio i1 and is especially smaller than ten (i2<10), i.e. that the differential carrier 26 rotates up to ten-times as slow than the electric motor 3. In total, with this embodiment according to FIG. 8 with a two-step spur gear drive, larger transmission to a slower speed can be achieved than with the embodiment according to FIG. 7 with a single-step spur gear drive.

Figure 9:
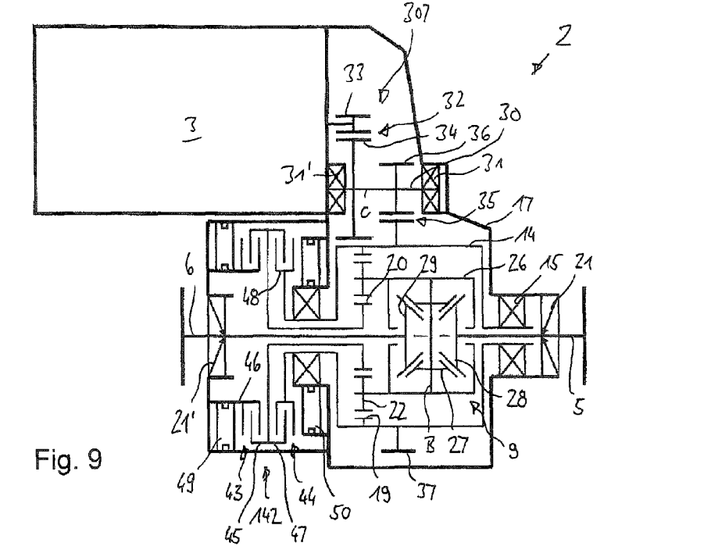

FIG. 9 shows an electric drive 2 according to a further embodiment. This largely corresponds to that embodiment of FIG. 8, so that concerning the common features, it is referred to the above description. In this case, the same or corresponding components are provided with the same reference numerals. Changed components are provided with reference numerals which are again increased by the numerical value 100.

It is visible, that the first gear stage 307 is formed as a two-step spur gear drive, as in the embodiment according to FIG. 4 or FIG. 8. It is, however, obvious, that the first gear stage could also be formed as a belt drive according to FIG. 1, as a chain drive according to FIG. 2 or as a single-step spur gear drive according to FIG. 3.

A characteristic feature of the present embodiment according to FIG. 9 is, that in the second gear stage 8, a clutch assembly 142 is provided. The clutch assembly 142 comprises a first friction clutch 43, which is arranged in the power path between the sun gear 20 and the stationary housing 17, as well as a second friction clutch 44, which is arranged in the power path between the sun gear and the ring gear 19. The two friction clutches 43, 44 are preferably formed as multi-plate clutches. The first friction clutch 43 comprises a clutch input element 45, which is connected so as to be rotationally fixed to the sun gear 20, a clutch output element 46, which is connected so as to be rotationally fixed to the stationary housing 17, as well as a disk package, which is arranged so as to be effective between the clutch input element 45 and the clutch output element 46.

The second friction clutch 44 comprises a clutch input element 47, which is connected so as to be rotationally fixed to the sun gear 20, respectively the clutch input element 45 of the first friction clutch 43, a clutch output element 48, which is connected in rotationally fixed manner to the ring gear 19 so as to rotate together with the same around the rotational axis A, as well as a disk package, which is arranged to act between the clutch input element 47 and the clutch output element 48.

For actuating the first friction clutch 43, a first actuating device 49 is provided, which, in this case, is schematically represented by a piston. For actuating the second friction clutch 44, a second actuating device 50 is provided, which is also schematically represented by a piston. The first or second actuating device 49, 50, respectively, can be of any form, for example in the form of a hydraulic, pneumatic, electromechanical or electro-magnetic actuator. The two actuating devices 49, 50 are controlled, when necessary, via an electronic control unit (not shown). By means of the use of two friction clutches 43, 44 and two separate actuating devices 49, 50, the two friction clutches 43, 44 can be controlled individually, respectively independently, of each other. The to be transmitted torque can be variably adjusted in dependency of the position of the respective friction clutch between a closed position, in which the full torque is transmitted, and an open position, in which no torque is transmitted, including any intermediate position therebetween.

With the present embodiment with a two-step spur gear drive 307 and the clutch assembly 142 with two friction clutches 43, 44, a transmission can be achieved, as in the embodiment of FIG. 8, which has one switching clutch. For example, when the first friction clutch 43 is completely closed and the second friction clutch 44 is completely open, so that the sun gear 20 is supported on the stationary housing 17 against rotation, a first transmission ratio i1 is achieved, which is smaller than 17 (i1<17), i.e. that the differential carrier 26 rotates up to 17-times as slow than the electric motor 3.

When vice versa the first friction clutch 43 is completely opened and the second friction clutch 44 is completely closed, so that the sun gear 20 and the ring gear 19 rotate together around the rotational axis A, a second transmission ratio i2 is achieved, which is smaller than the first transmission ratio i1 and, especially, smaller than 10 (i2<10), i.e. that the differential carrier 26 rotates up to ten-times as slow than the electric motor 3. By means of corresponding control of the two friction clutches 43, 44 in the intermediate positions, also any other transmission ratio can be set, which is smaller than 17 and larger than 10. Especially, with the present embodiment a load interruption free switching is enabled. The switching under load takes place quickly and comfortably.

Figure 10:
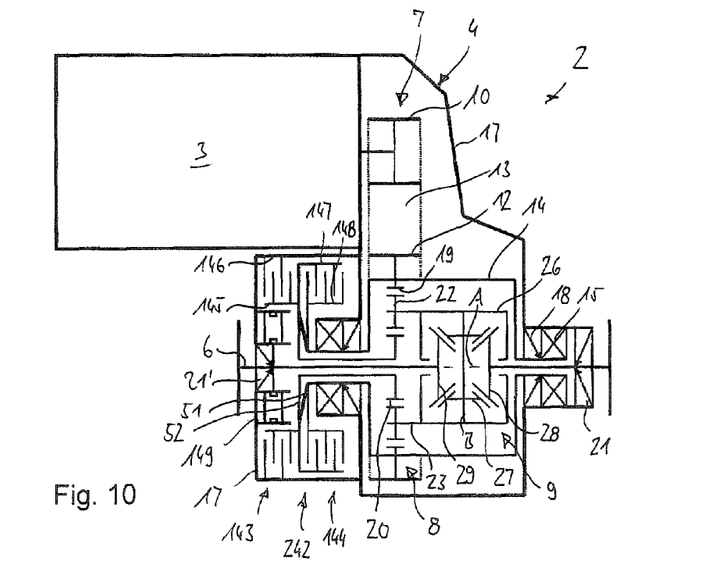

FIG. 10 shows an electric drive 2 according to a further embodiment. This largely corresponds to the embodiments of FIG. 5 and FIG. 9, so that concerning the common features, it is referred to the above description. In this case, the same or corresponding components are provided with the same reference numerals. Changed components are provided with reference numerals which are further increased by the numerical value 100.

It is visible, that the first gear stage is formed as a belt drive, as in the embodiment of FIG. 1 or FIG. 5. It is, however, understandable, that the first transmission gear step could also be formed as a chain drive of FIG. 2 or as a single-step spur gear drive according to FIG. 3 or as a two-step spur gear drive according to FIG. 4.

The characteristic feature of the present embodiment according to FIG. 10 is that the clutch assembly 242 has two friction clutches 143, 144, which are actuated by means of single actuating device 149. The first friction clutch 143 is arranged in the power path between the sun gear 20 and the stationary housing 17. The second friction clutch 144 is arranged in the power path between the sun gear and the ring gear 19. The two friction clutches 143, 144 are formed preferably as friction disk clutches. The first friction clutch 143 comprises a clutch input element 145, which is connected so as to be rotationally fixed to the sun gear 20, a clutch output element 146, which is connected so as to be rotationally fixed to the stationary housing 17, as well as a first disk package, of which first disks are connected in a rotationally fixed manner to the clutch input element 145, and of which second disks are connected in a rotationally fixed manner to the clutch output element 146.

The second friction clutch 144 comprises a clutch input element 147, which is connected in a rotationally fixed manner to the sun gear 20, respectively to the clutch input element 145 of the first friction clutch 143, a clutch output element 148, which is connected in a rotationally fixed way to the ring gear 19 and rotates together therewith around the rotational axis A, as well as a second disk package, of which first disks are connected so as to be rotationally fixed to the clutch input element 147, and of which second disks are in a connected rotationally fixed manner to the clutch output element 148. The first and second disks of the two clutch packs are arranged axially alternatingly.

A spring mechanism 51 is provided, which acts on the first friction clutch 143 in the closing direction, i.e. into a position, in which the sun gear 20 is decelerated relative to the stationary housing 17. At the same time, the second friction clutch 144 is urged by the spring mechanism 51 in the open direction, i.e. into a position, in which no torque is transmitted between the sun gear 20 and the ring gear 19. As a spring mechanism 51, all suitable springs can be used, which produce an elastic biasing, for example Belleville spring washers or coil springs.

For actuating the clutch assembly 242, the actuating device 149 is provided, which is schematically represented by a piston. The actuating device 149 is formed such, that by means of its activation, the first friction clutch 143 is urged to the open direction, while the second friction clutch 144 is urged in the closing direction. This is achieved such that the clutch input element 145 of the first friction clutch 143 and the clutch input element 147 of the second friction clutch 144 are firmly connected to each other. For this, especially, a pressure plate 52 can be provided, which acts on both clutch input elements 145, 147 simultaneously. It is also possible, that the actuating device 149 actuates in a first displacement portion the first friction clutch 143 in the opening direction and in a second displacement portion actuates the second friction clutch 144 in the closing direction.

The actuating device 149 is here represented as a hydraulic actuator. It is, however, obvious, that the actuating means can also have any other form, for example in the form of a pneumatic, electro-mechanical or electromagnetic actuator. As already in the above embodiments with clutch assembly according to FIGS. 5-9, it is also valid for the present embodiment, that the actuating device can be controlled by an electronic control unit (not shown), as required. By using a single actuating device 149, the number of components is reduced and the construction simple and compact. By the use of friction clutches 143, 144, any intermediate position between the open position and the closed position can be set, so that the transmittable torque and, thus, the transmission ratio between the defined end portions is variably adjustable.

With the present embodiment with a belt drive 7 and the clutch assembly 242 with two friction clutches 143, 144, a transmission can be achieved as in the embodiment according to FIG. 6, which has a switching clutch. I.e., when the first friction clutch 143 is completely closed and the second friction clutch 144 is completely open, so that the sun gear 20 is supported on the stationary housing 17 against rotation, a first transmission ratio i1 is achieved, which is smaller than eight, i.e. i1<8. When vice versa, the first friction clutch 143 is completely open and the second friction clutch 144 is completely closed, so that the sun gear 20 and the ring gear 19 rotate together around the rotational axis A, a second transmission ratio i2 is achieved, which is smaller than the first transmission ratio i1 and is, especially, smaller than five, i.e. i2<5. By means of corresponding control of the actuating device in intermediate positions also any other transmission ratio can be set, which is smaller than 8 and larger than 5.

The electric drive according to the above described embodiments has the advantage of a compact configuration, as the second and third gear stages, i.e. the planetary drive and the differential drive are arranged coaxially to each other and can be arranged in a common housing, which is rotatingly driveable by means of the first gear stage. Depending on the arrangement of the first gear stage or by means of providing a clutch assembly, respectively, different transmission ratios can be realized. This again enables an optimal adjustment between the electric motor and the drive unit.

The invention claimed is:

1. An electric drive for a motor vehicle comprising:
an electric motor and drive unit driveable by the electric motor
wherein the drive unit has a planetary drive and a differential drive, which are arranged coaxially to a rotational axis(A),
wherein the planetary drive comprises a ring gear, a sun gear, a multitude of planet gears as well as a planet carrier,
wherein the ring gear is rotatingly driveable by the electric motor around the rotational axis (A), wherein the sun gear is configured to be one of supported and supportable on a stationary component against rotation, and wherein the planet carrier is connected to a differential carrier of the differential drive;
wherein the ring gear of the planetary drive is firmly connected to a housing, and wherein the housing is rotatingly driveable by the electric motor, and
wherein the planetary drive and the differential drive are arranged in said rotatingly driveable housing.

2. The electric drive according to claim 1,
wherein the rotatingly driveable housing comprises means for introducing torque, which are formed in the form of an external toothing.

3. The electric drive according to claim 1,
wherein the planetary drive and the differential drive are arranged axially next to each other in the rotatingly driveable housing.

4. The electric drive according to claim 1,
wherein the differential carrier is rotatably supported relative to the rotatingly driveable housing around the rotational axis (A).

5. The electric drive according to claim 1,
wherein the rotatingly driveable housing is rotatably supported around the rotational axis (A) relative to the stationary component.

6. The electric drive according to claim 1,
wherein between the sun gear of the planetary drive and the stationary component, an externally controllable clutch assembly is provided.

7. The electric drive according to claim 6,
wherein an actuating device for actuating the clutch assembly is provided.

8. The electric drive according to claim 6,
wherein the clutch assembly comprises a switching clutch, which is transferable at least into a first switching position and into a second switching position, wherein in the first switching position of the switching clutch, the sun gear is connected rotationally fixed to the stationary component and the ring gear is freely rotatable to the sun gear, and
wherein in the second switching position of the switching clutch, the sun gear is connected rotationally fixed to the ring gear for transmitting torque and is freely rotatable relative to the stationary component.

9. The electric drive according to claim 8,
wherein the switching clutch is transferable into a third switching position, in which the sun gear is freely rotatable relative to the stationary component and to the ring gear.

10. The electric drive according to claim 6,
wherein the clutch assembly comprises a first friction clutch which is arranged between the sun gear of the planetary drive and the stationary component, and
a second friction clutch, which is arranged between the sun gear and the ring gear.

11. The electric drive according to claim 10,
wherein the first and the second friction clutch are variably controllable, respectively, between an open position, in which a torque transmission is interrupted, and a closed position, in which torque is transmitted.

12. The electric drive according to claim 10, wherein for the first and the second friction clutch respectively, a separate actuating device is provided, which can individually actuate the corresponding friction clutch.

13. The electric drive according to claim 10, wherein a common actuating device is provided for the first friction clutch and the second friction clutch, which actuating device is configured such, that the first friction clutch is closed, when the second friction clutch is opened.

14. The electric drive according to claim 13, wherein the common actuating device is configured such that the first friction clutch is opened, when the second friction clutch is closed.

15. The electric drive according to claim 1, wherein the stationary component is configured in the form of a stationary housing.

16. The electric drive according to claim 1, wherein the rotatingly driveable transmission housing is rotatingly driveable by the electric motor via a reduction gear, which is configured as one of either a chain drive, a belt drive, or a spur gear drive.

* * * * *